United States Patent
Calippe et al.

(10) Patent No.: US 9,635,102 B2
(45) Date of Patent: Apr. 25, 2017

(54) BROKER MODULE FOR MANAGING AND MONITORING RESOURCES BETWEEN INTERNET SERVICE PROVIDERS

(71) Applicant: Google Inc., Mountain View, CA (US)

(72) Inventors: Joel Calippe, San Jose, CA (US); Gurudas Somadder, San Jose, CA (US)

(73) Assignee: Google Inc., Mountain View, CA (US)

( * ) Notice: Subject to any disclaimer, the term of this patent is extended or adjusted under 35 U.S.C. 154(b) by 150 days.

(21) Appl. No.: 14/204,354

(22) Filed: Mar. 11, 2014

(65) Prior Publication Data

US 2014/0280972 A1    Sep. 18, 2014

Related U.S. Application Data

(60) Provisional application No. 61/778,145, filed on Mar. 12, 2013.

(51) Int. Cl.
| | | |
|---|---|---|
| *G06F 15/173* | (2006.01) | |
| *H04L 29/08* | (2006.01) | |
| *H04L 12/26* | (2006.01) | |
| *H04L 12/24* | (2006.01) | |

(52) U.S. Cl.
CPC ...... *H04L 67/1012* (2013.01); *H04L 43/0817* (2013.01); *H04L 41/0893* (2013.01); *H04L 41/5022* (2013.01); *H04L 43/0864* (2013.01); *H04L 43/0876* (2013.01); *H04L 43/10* (2013.01); *H04L 43/16* (2013.01)

(58) Field of Classification Search
CPC .................. H04L 43/0876; H04L 67/1012
USPC .................................................. 709/226
See application file for complete search history.

(56) References Cited

U.S. PATENT DOCUMENTS

| | | | | |
|---|---|---|---|---|
| 7,043,225 | B1* | 5/2006 | Patel | H04L 12/14 455/404.2 |
| 7,647,411 | B1* | 1/2010 | Schiavone | 709/206 |
| 8,260,959 | B2* | 9/2012 | Rudkin | H04L 12/14 370/230 |
| 9,032,077 | B1* | 5/2015 | Klein | H04L 29/08 370/395.21 |
| 2002/0178263 | A1* | 11/2002 | Hreha | H04B 7/18584 709/226 |
| 2003/0101124 | A1* | 5/2003 | Semret | G06F 9/50 705/37 |
| 2004/0107281 | A1* | 6/2004 | Bose | H04L 29/06 709/226 |
| 2004/0111308 | A1* | 6/2004 | Yakov | G06Q 10/087 705/28 |
| 2011/0153802 | A1* | 6/2011 | Steiner | H04L 67/104 709/224 |

* cited by examiner

*Primary Examiner* — Joseph Greene
(74) *Attorney, Agent, or Firm* — Brake Hughes Bellermann LLP

(57) ABSTRACT

Disclosed is a method for managing resources between a plurality of internet service providers, that includes receiving a set of resources and constraints for each internet service provider of the plurality of internet service providers and allocating resources of the plurality of internet service providers to service client devices of the plurality of internet service providers, wherein at least some resources of a first internet service provider are allocated for servicing a client device that is associated with a second internet service provider.

23 Claims, 10 Drawing Sheets

CLIENT RESOURCES AND
CONSTRAINTS

-Available Data Centers
  -Available Resources

-Location Policy
  -IP Proximity
  -Ping Time
  -Data Center Capacity
  -Link Quality -Service Level Agreements
  -Priority
  -Resources Requested
  -Bursting
  -Lending/Sharing -Custom Content

FIG. 3

BROKER MODULE FOR MANAGING AND MONITORING RESOURCES BETWEEN INTERNET SERVICE PROVIDERS

CROSS-REFERENCE TO RELATED APPLICATIONS

The present application claims the benefit of U.S. Provisional Application 61/778,145 filed on Mar. 12, 2013, which is hereby incorporated by reference in its entirety.

FIELD OF THE INVENTION

The invention relates to internet service providers, and in particular to a broker module for managing and monitoring resources between internet service provider.

BACKGROUND

Remote gaming is a mechanism by which users of a client device interact with a game that is running at a remote location. Client devices are allocated resources at a remote location through an internet service provider (ISP) for servicing remote gameplay. An ISP includes several data centers for servicing various client devices utilizing that ISP. Each data center may include multiple blades (e.g., individual processing entity of the data center), each blade including various resources (e.g., CPU and GPU) for servicing the client.

Conventionally, an ISP manages resources for its associated client devices by determining an appropriate data center and blade within its own resource pool for servicing each of those client devices. Because an ISP can only manage its own resource pool and additionally because an ISP can only allocate resources from its own resource pool several non-optimal situations may occur.

In some circumstances, the resource pool may be utilized at maximum capacity such that additional users of client devices may need to wait for resources to free up prior to being serviced. In some other circumstances, the optimal set of resources for a given user of a client device may be currently occupied by another user, such that the requesting user of the client device is assigned to a sub-optimal set of resources. In such circumstances, users are not experiencing an optimal remote gameplay experience as the user is experiencing a wait time prior to gameplay or the user is being serviced by a suboptimal set of resources.

In certain other circumstances, the resource pool may outnumber user demand. In such circumstances, the unused resources are being underutilized (e.g., remain idle) resulting in inefficiency.

SUMMARY

Some embodiments of the present invention are directed to a broker module for managing and monitoring resources between internet service providers.

Further details of aspects, objects and advantages of the invention are described below in the detailed description, drawings and claims. Both the foregoing general description and the following detailed description are exemplary and explanatory and are not intended to be limiting as to the scope of the invention.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

FIG. 3 illustrates an example set of constraints and resources provided by an internet service provider to a broker module in accordance with some embodiments.

DETAILED DESCRIPTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments" in various places throughout this specification are not necessarily referring to the same embodiment or embodiments.

Some embodiments of the present invention are directed to a broker module for managing and monitoring resources between internet service providers. In this way, users of client devices associated with an internet service provider (ISP) with a resource pool utilized to full capacity or users of client devices associated with an internet service provider where the optimal set of resources for those users are currently occupied may borrow resources from the resource pool of another internet service provider (ISP). Additionally, the resource pool for a given internet service provider (ISP)

may be utilized more efficiently by reducing the amount of unused resources through lending of those resources to users of client devices associated with other ISPs.

Figure 1:
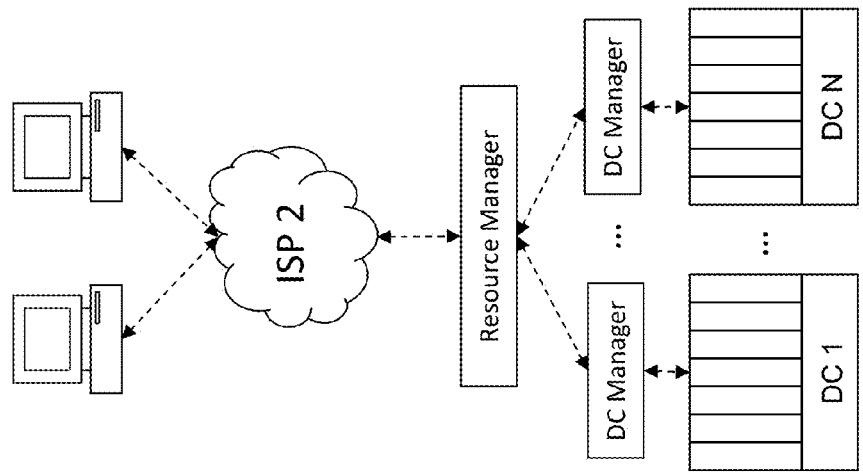
FIG. 1 illustrates an example remote gaming environment.
Figure 1:
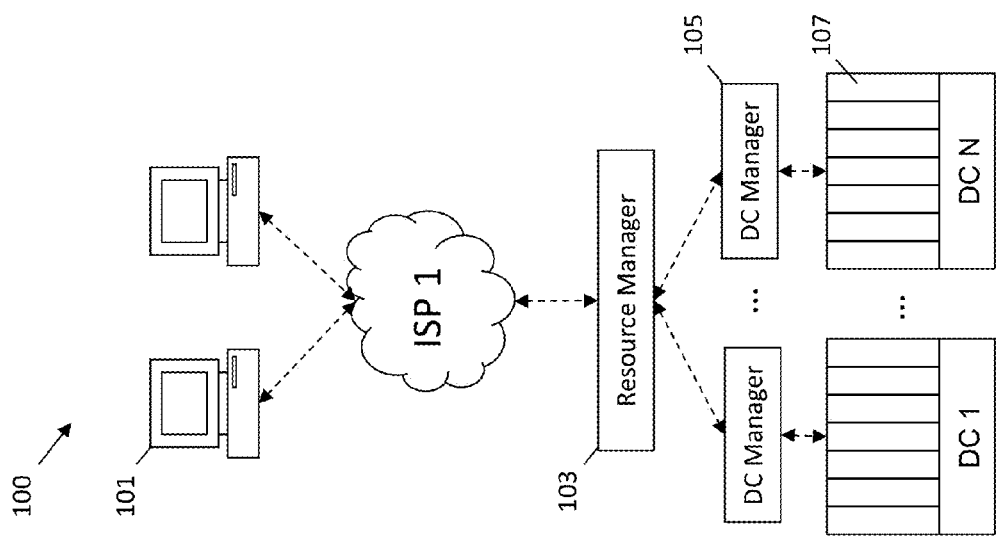

Remote gaming is a mechanism by which users of a client device interact with a game that is running at a remote location. FIG. 1 illustrates an example remote gaming environment 100. The remote gaming environment 100 includes several client devices 101 and multiple internet service providers ISP1, ISP2. Each internet service provider ISP1, ISP2 includes a corresponding resource manager 103, a plurality of corresponding data center managers 105, and a plurality of data centers DC. Each data center DC may include several blades 105 (e.g., individual processing entities of the data center DC) that may run games to service one or more client devices 101 at a time. Each blade 105 includes various resources (e.g., CPU and GPU) for servicing its corresponding client devices 101.

Client devices 101 are associated with an internet service provider ISP1, ISP2 that provides the infrastructure for servicing remote gaming for those client devices 101. Each internet service provider ISP1, ISP2 includes a resource manager 103 that manages the data centers DC (e.g., resource pool) for that internet service provider ISP1, ISP2. The resource manager 103 for an internet service provider ISP1, ISP2 may communicate with several data center managers 105, each of which is managing the blades 105 and resources of an individual data center DC.

When a user of a client device 101 requests to be serviced by its internet service provider ISP1, ISP2, a corresponding resource manager 103 is used to determine which data center to assign the client device 101. The corresponding resource manager 103 may receive information from data center managers 105 to facilitate its assignment of the client device 101. Assignment of a client device 101 to a data center DC may be based on various factors. For example, a client device 101 may be assigned to a particular data center DC based on its proximity to that data center. The client device 101 may also be assigned to a particular data center DC based on the resources available at that data center DC.

After the resource manager 103 has assigned the client device 101 to a particular data center DC, the data center manager 105 for that particular data center DC is used to assign the client device to a particular blade 107 and set of resources within that data center DC. Assignment of a client device 101 to a particular blade 107 may be based on various factors. For example, a client device 101 may be assigned to a particular blade 107 based on the resources (e.g., CPU and GPU) associated with that blade 107. The client device 101 may also be assigned to a particular blade 107 based on the availability of that blade 107.

Because an internet service provider ISP1, ISP2 can only manage its own resource pool (e.g., data center, blades, etc.) and additionally because an internet service provider ISP1, ISP2 can only allocate resources from its own resource pool several non-optimal situations may occur.

In some circumstances, the resource pool may be utilized at maximum capacity such that additional users of client devices 101 may need to wait for resources to free up prior to being serviced. In some other circumstances, the optimal set of resources for a given user of a client device 101 may be currently occupied by another client device 101, such that the requesting client device 101 is assigned to a sub-optimal set of resources. In such circumstances, users are not experiencing an optimal remote gameplay experience as the user is experiencing a wait time prior to gameplay or the user is being serviced by a suboptimal set of resources.

In certain other circumstances, the resource pool may outnumber user demand. In such circumstances, the unused resources are being underutilized (e.g., remain idle) resulting in inefficiency.

Figure 2:
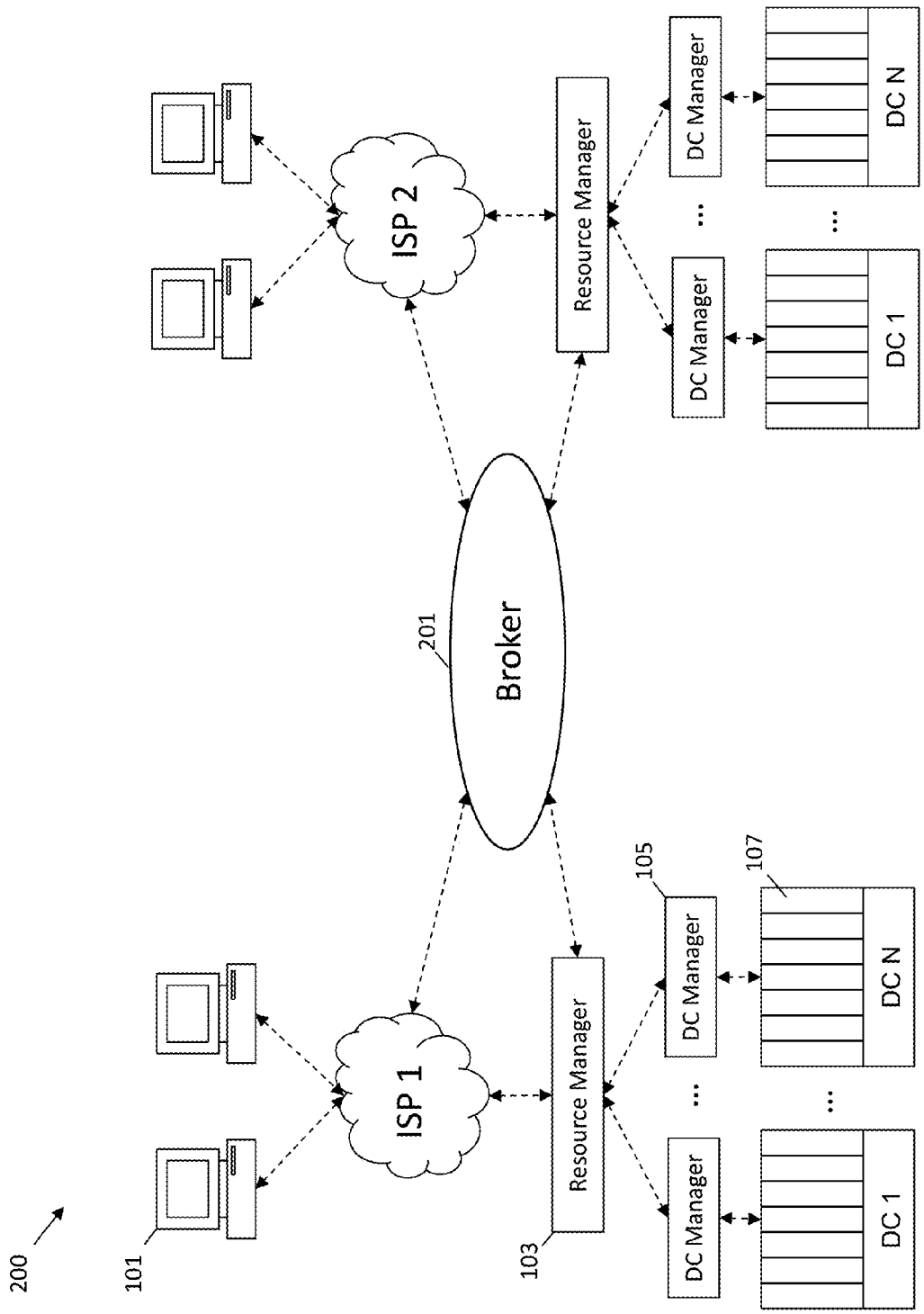
FIG. 2 illustrates a remote gaming environment with a broker module for managing and monitoring resources between different internet service providers according to some embodiments.

One way to overcome these limitations is to implement a broker module for managing and monitoring resources between different internet service providers. FIG. 2 illustrates a remote gaming environment 200 with a broker module 201 for managing and monitoring resources between different internet service providers ISP1, ISP2 according to some embodiments.

The remote gaming environment 200 of FIG. 2 is very similar to the remote gaming environment 100 of FIG. 1, with the addition of a broker module 201. The broker module 201 provides a link between each internet service provider ISP1, ISP2 and its corresponding resource manager 103. Rather than having each internet service provider ISP1, ISP2 manage its own resources (e.g., data centers, blades, etc.), the broker module 201 is used to manage resources for all of the internet service providers ISP1, ISP2.

While only two internet service providers ISP1, ISP2 are depicted in FIG. 2, one ordinarily skilled in the art will recognize that the remote gaming environment 200 of FIG. 2 may be expanded to support a broker module 201 that manages resources for any number internet service providers ISP1, ISP2. Furthermore, while only two client devices 101 are associated with each internet service provider ISP1, ISP2, one ordinarily skilled in the art will recognize that the remote gaming environment 200 of FIG. 2 may be expanded to support any number of client devices 101 for a given internet service provider ISP1, ISP2.

Each internet service provider ISP1, ISP2 initially provides the broker 201 with a set of resources. For example, each internet service provider ISP1, ISP2 may allocate a set of data centers for the broker module 201 to manage. Each internet service provider ISP1, ISP2 may then provide the broker module 201 with a set of constraints. For example, each internet service provider ISP1, ISP2 may provide the broker module 201 with a set of service level agreements (e.g., priority constraints, minimal amount of resources, etc.). Additional constraints will be described in greater detail below.

Based on the resources and constraints provided by each internet service provider ISP1, ISP2, the broker module 201 may then provide end users of client devices 101 associated with an internet service provider ISP1, ISP2 a proper set of resources. The broker module 201 communicates with the resource manager 103 of each internet service provider ISP1, ISP2 to assign client devices 101 to particular data centers associated with those internet service providers ISP1, ISP2. The resource manager 103 may then communicate with its corresponding data center managers 105 to assign client devices 101 to particular blades and resources within a data center DC. Alternatively, the broker module 201 may communicate directly with each data center manager 105 to assign client devices 101 to particular blades and resources within a data center DC.

Having a broker module 201 that provides management and monitoring to several internet service providers ISP1, ISP2 allows for resources to be utilized more efficiently and optimally. So long as the constraints for a given internet service provider ISP1, ISP2 are met by the broker module 201, unused resources for that internet service provider ISP1, ISP2 may be redistributed to facilitate servicing of client devices associated with other internet service providers ISP1, ISP2.

For a user of a client device 101 associated with an internet service provider ISP1, ISP2 with a resource pool utilized to full capacity, the broker module 201 may borrow resources from the resource pool of another internet service provider ISP1, ISP2 to service the user of the client device 101. Likewise, for a user of a client device 101 associated with an internet service provider ISP1, ISP2 where the optimal set of resources for that user is currently occupied, the broker module 201 may again borrow resources from the resource pool of another internet service provider ISP1, ISP2 to service the user of the client device 101. Additionally, unused resources of a resource pool of a given internet service provider ISP may be lent to users of client devices 101 associated with other internet service providers ISP1, ISP2.

The broker module 201 may optimize how resources are shared between internet service providers ISP1, ISP2 and how client devices 101 are assigned resources by utilizing a learning process. During operation, the resource manager 103 may provide statistics and metrics to the broker module 201 depicting operating conditions which may be utilized by the broker module 201 to optimize subsequent resource assignment and resource borrowing. The resource manager 103 may receive statistics and metrics from its corresponding data center managers 105 and forward those statistics and metrics to the broker module 201. Alternatively, the data center managers 105 may directly forward statistics and metrics to the broker module 201.

In some embodiments, the statistics and metrics may be provided periodically by the resource manager 103 or data center managers 105 to the broker module 201. In other embodiments, the statistics and metrics may be provided by the resource manager 103 or data center managers 105 to the broker module 201 upon request.

In some embodiments, the statistics and metrics may include the number of resources an internet service provider ISP1, ISP2 has available. For example, the statistics and metrics may indicate the total number of data centers DC available for a given internet service provider ISP, the total number of blades 107 for each data center DC, and the number and types of resources associated with each blade 107.

In some embodiments, the statistics and metrics may include the number of resources used by an internet service provider ISP1, ISP2 out of those available. For example, the statistics and metrics may indicate the total number of blades 107 being used for each data center, and the amount of resources being used by each blade 107 at any given time.

In some embodiments, the statistics and metrics may include the number of resources loaned by an internet service provider ISP1, ISP2 to another internet service provider ISP1, ISP2. For example, the statistics and metrics may indicate the total number of blades 107 being loaned by a data center DC or the total number of resources being loaned by a blade 107 at any given time.

In some embodiments, the statistics and metrics may include the number of resources borrowed by an internet service provider ISP1, ISP2 from another internet service provider ISP1, ISP2. For example, the statistics and metrics may indicate the total number of blades being borrowed by an internet service provider ISP1, ISP2 or the total number of resources being borrowed from a blade by an internet service provider ISP1, ISP2.

By utilizing such statistics and metrics, the broker module 201 may optimize subsequent resource assignment and resource borrowing as discussed above. Furthermore, in addition to providing for resources to be utilized more efficiently and optimally, broker modules 201 also serve the purpose of alleviating the responsibility of internet service providers ISP1, ISP2 managing and monitoring its own resources.

FIG. 3 illustrates an example set of constraints and resources provided by an internet service provider to a broker module in accordance with some embodiments.

The set of resources provided by an internet service provider may include the available data centers for that internet service provider and the available blades associated with each available data center. Additionally, the set of resources provided by the internet service provider may further include the set of resources available for each blade.

The set of constraints provided by an internet service provider may include location policies for that internet service provider, service level agreements for that internet service provider and custom content for that internet service provider. Location policies may include IP proximity constraints, ping time constraints, data center capacity constraints, and link quality constraints. IP proximity constraints indicate the proximity a client device's IP address must be in relation to a data center servicing that client device. Ping time constraints indicate the ping time that must be met when a data center/blade is servicing a client device. Data center capacity indicates the maximum operating capacity for data centers associated with the internet service provider. Link quality indicates the level of lossiness tolerable for a client device connection. It is important to note that different users of an internet service provider may be associated with different location policies based on their subscribed level of service.

Service level agreements may include priority for an internet service provider, resources requested by the internet service provider, bursting capabilities to be provided to the internet service provider, and lending/sharing constraints for the internet service provider. Priority indicates the level of priority an internet service provider is provided in comparison to other internet service providers utilizing the broker module. For example, an internet service provider with a high level of priority may utilize unused resources earlier than an internet service provided with a lower level of priority. Resources requested by the internet service provider indicate a minimum amount of resources to be available at all times to the internet service provider. For example, an internet service provider may indicate that at least 5 out of 10 data centers are available to service its end users at all times. Bursting capabilities indicate a level of bandwidth transmission over a short period of time to be provided to end users of the internet service provider. Lending/sharing constraints indicate a number of resources to be shared or borrowed by an internet service provider. For example, an internet service provider may indicate a small percentage of resources to be shared with other internet service providers while also indicating an unlimited number of resources to be borrowed from other internet service providers.

Finally, custom content constraints may be used to indicate certain custom content available only to end users of an internet service provider such that users of other internet service providers may not be given access to that content.

The set of resources and set of constraints are used by the broker module to determine how to manage and monitor resources between internet service providers. The broker module utilizes the set of resources for an internet service provider to understand what resources are available for that particular internet service provider. The broker module then utilizes the set of constraints to determine how resources may be shared amongst internet service providers and also to determine how resources should be provided to client devices. Ultimately, the broker module acts to provide a level of service to end users of an internet service provider in line with the constraints provided by the internet service provider, while allowing resources to be shared amongst internet service providers.

Figure 4:
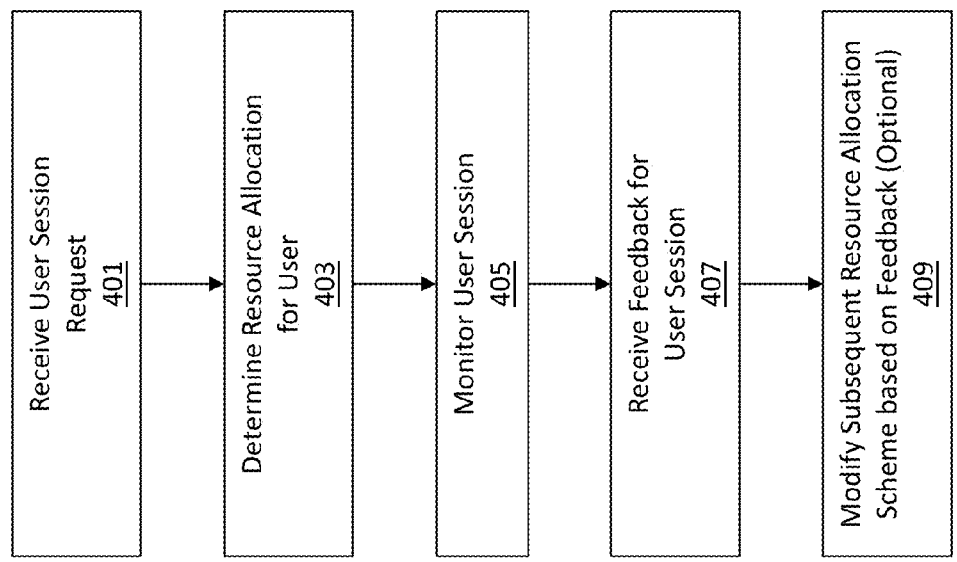
FIG. 4 is a flow chart illustrating a method for managing and monitoring resources between internet service providers by a broker module in accordance with some embodiments.

FIG. 4 is a flow chart illustrating a method for managing and monitoring resources between internet service providers by a broker module in accordance with some embodiments.

Initially, the broker module receives a set of resources and constraints from all internet service providers utilizing the broker module. The broker module sets up connections with resource managers, data center managers, data centers, blades and their associated resources. Once the initial setup has been performed, the broker module operates to manage and monitor resources between internet service providers that are utilizing the broker module.

The broker module may first receive a user session request from a client device as shown at 401. For example, a client of a user device may request to interact with a certain game through its internet service provider.

The request may be forwarded to the broker module, which then determines how resources should be allocated for that client device as shown at 403. The determination of how resources should be allocated for the user may be based on the set of resources and constraints provided by the internet service providers.

In some embodiments, the broker module may determine that the client device is best serviced by a blade of a data center provided by the internet service provider. For example, the blade of the data center may have the required resources for the client device and meet the constraints provided by the internet service provider.

In other embodiments, the broker module may determine that the client device is best serviced by a blade of a data center provided by another internet service provider. For example, the blade of the data center provided by the other internet service provider may have the required resources for the client device and meet the constraints provided by its internet service provider as well as the constraints provided by the internet service provider associated with the client device. This situation may arise where the resource pool for the internet service provider associated with the client device is utilized to maximum capacity such that additional users of client devices need to wait for resources to free up prior to being serviced. This situation may also arise where the optimal set of resources for the client device may be currently occupied by another client device, such that the requesting client device can only be assigned to a sub-optimal set of resources when using resources provided by its own internet service provider. By servicing the client device using resources provided by another internet service provider while still meeting constraints for both the other internet service provider and the internet service provider associated with the client device, the client device may experience optimal gameplay while resources are utilized more efficiently and optimally.

Once resources have been allocated to the client device, the broker module continues to monitor the user session as shown at 405. Monitoring may involve observing the user session to ensure that no errors or failures occur and also providing the proper support in case of error or failure. Support may include moving a user session from a failing blade or data center to an alternative blade or data center that is properly functioning and can optimally service the client device.

The broker module may also receive feedback about its resources as shown at 407. In some embodiments, this may occur periodically during operation of the broker module. As discussed above, feedback may involve receiving statistics and metrics from resources managed by the broker module that depict operating conditions which may be utilized by the broker module to optimize subsequent resource assignment and resource borrowing.

In some embodiments, the resource manager for each internet service provider may receive statistics and metrics from its corresponding data center managers and forward those statistics and metrics to the broker module. Alternatively, in other embodiments, the data center managers for each internet service provider may directly forward statistics and metrics to the broker module.

After the broker module receives feedback, it may modify its subsequent resource allocation schemes based on the feedback to better optimize resource allocation for subsequent client device requests as shown at 409. For example, the broker module may learn that a particular data center is rarely utilized and as such may prioritize blades of that data center for sharing. Likewise, the broker module may learn that a particular data center is highly utilized and as such may de-prioritize blades of that data center for sharing.

Having a broker module that provides management and monitoring to several internet service providers allows for resources to be utilized more efficiently and optimally. The broker module acts to provide a level of service to end users of an internet service provider in line with the constraints provided by the internet service provider, while allowing resources to be shared amongst internet service providers. Furthermore, the broker module employs a learning process to allow for subsequent resource assignment and resource borrowing optimization as discussed above.

Figure 5:
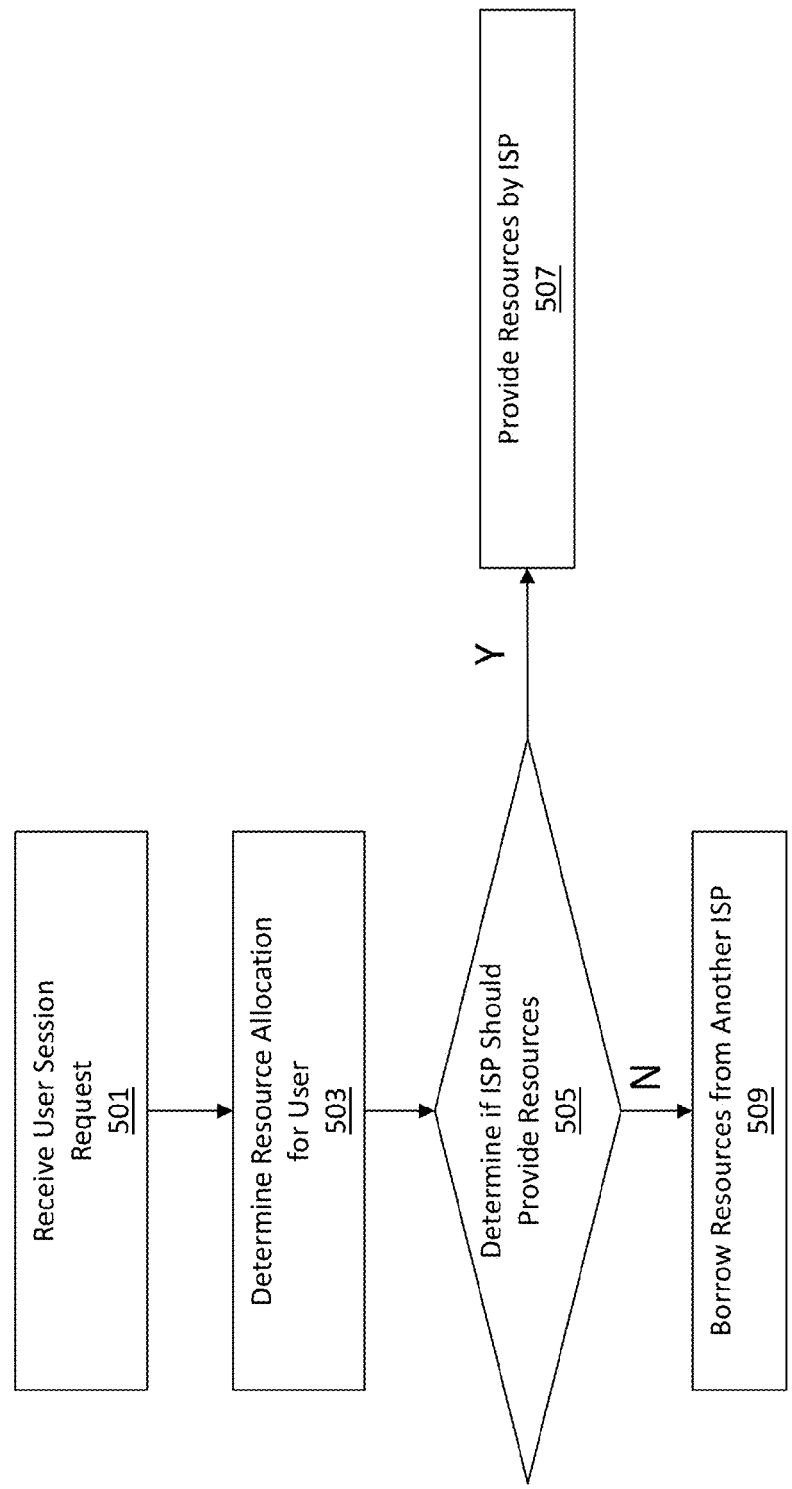
FIG. 5 is a flow chart illustrating a method for sharing resources between internet service providers by a broker module in accordance with some embodiments.

FIG. 5 is a flow chart illustrating a method for sharing resources between internet service providers by a broker module in accordance with some embodiments.

The broker module may first receive a user session request from a client device as shown at 501. For example, a client of a user device may request to interact with a certain game through its internet service provider.

The request may be forwarded to the broker module, which then determines how resources should be allocated for that client device as shown at 503. In determining how resources should be allocated for that client device, a determination is first made by the broker module as to whether the internet service provider associated with the client device can provide the resources needed by the client device as shown at 505. For example, the broker module may communicate with the resource manager or data center managers of the internet service provider associated with the client device to determine whether optimal resources are available at a blade for servicing the client device.

If the broker module determines that the internet service provider associated with the client device is capable of providing the resources needed by the client device in line with the constraints provided by the internet service provider, then the client device is provided resources from its associated internet service provider as shown at 507.

If the broker module determines that the internet service provider associated with the client device is unable to provide the resources needed by the client device in line with the constraints provided by the internet service provider, then the client device is provided resources from another internet service provider as shown at 509. The client device may be provided resources from another internet service provided based on statistics and metrics received by the broker module. It is important to note that the client device is provided resources from another internet service provider so long as constraints are met for the other internet service provider and the internet service provider associated with the client device.

The situation where the internet service provider associated with the client device is unable to provide the resources needed by the client device may arise where the resource pool for the internet service provider associated with the client device is utilized to maximum capacity such that additional users of client devices need to wait for resources to free up prior to being serviced. This situation may also arise where the optimal set of resources for the client device may be currently occupied by another client device, such that the requesting client device can only be assigned to a sub-optimal set of resources when using resources provided by its own internet service provider.

By servicing the client device using resources provided by another internet service provider while still meeting constraints for both the other internet service provider and the internet service provider associated with the client device, the client device may experience optimal gameplay while resources are utilized more efficiently and optimally.

Figure 6:
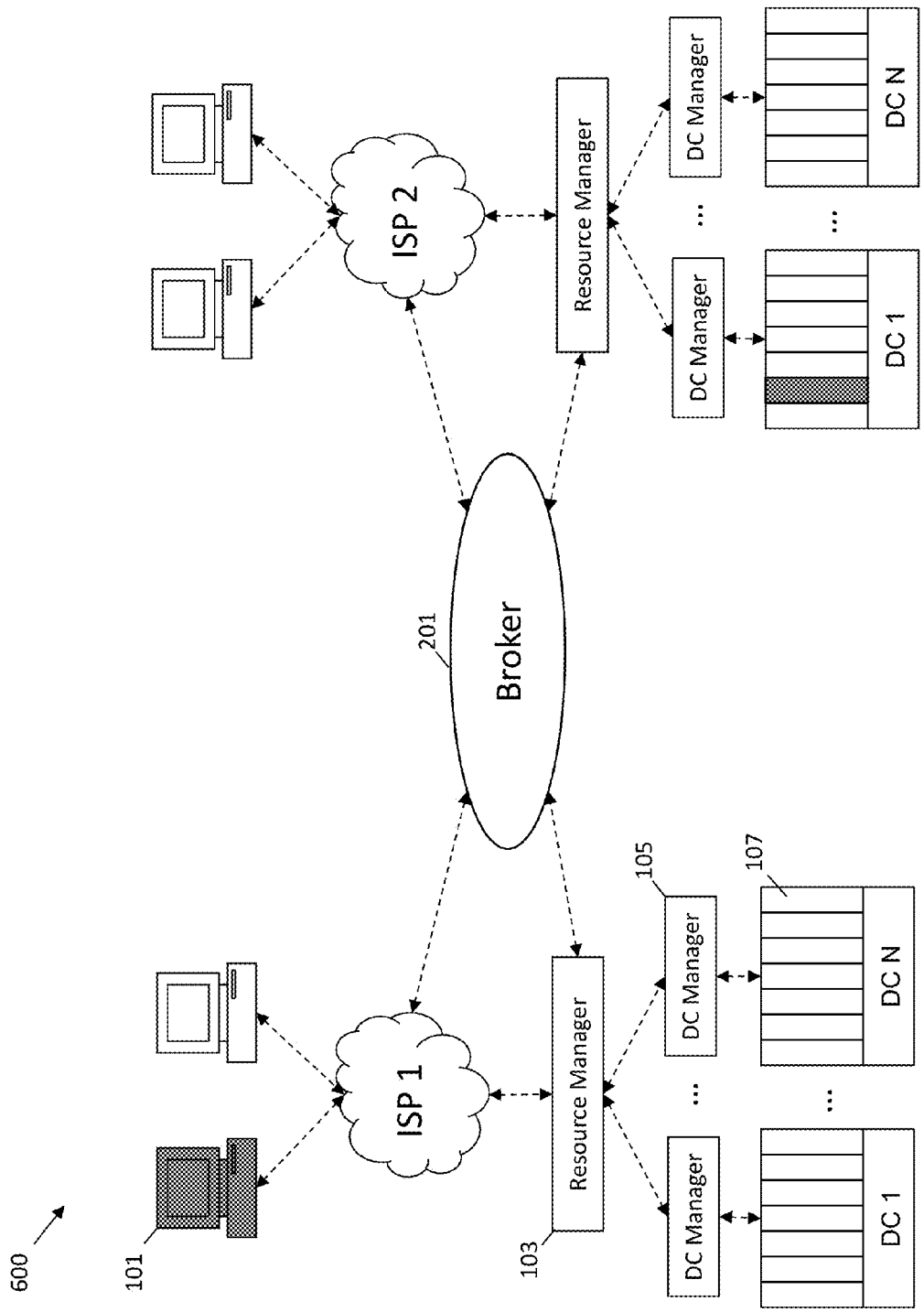
FIG. 6 illustrates a remote gaming environment wherein a client device is allocated resources from another internet service provider in accordance with some embodiments.

FIG. 6 illustrates a remote gaming environment 600 wherein a client device 101 is allocated resources from another internet service provider in accordance with some embodiments. The remote gaming environment 600 of FIG. 6 is substantially similar to the remote gaming environment 200 of FIG. 2 and as such will not be described again in detail.

In the remote gaming environment 600 of FIG. 6, a client device (depicted by gray shading) 101 belonging to a first internet service provider ISP1 is allocated resources of a second internet service provider ISP2 by the broker module 201.

As discussed above, this situation may arise where the resource pool for the first internet service provider ISP1 is utilized to maximum capacity such that requesting client device (depicted by grey shading) 101 needs to wait for resources of the first internet service provider ISP1 to free up prior to being serviced by the first internet service provider ISP1. This situation may also arise where the optimal set of resources for the requesting client device (depicted by grey shading) 101 may be currently occupied by another client device, such that the requesting client device (depicted by grey shading) 101 can only be assigned to a sub-optimal set of resources when using resources provided by the first internet service provider ISP1. By instead servicing the client device (depicted by grey shading) 101 using resources provided by a second internet service provider ISP2 while still meeting constraints for both the second internet service provider ISP2 and the first internet service provider ISP1, the client device (depicted by grey shading) 101 may experience optimal gameplay while resources are utilized more efficiently and optimally.

In addition to servicing a client device using resources provided by another internet service provider, the broker module may also perform pre-emption in certain circumstances. Pre-emption refers to the action of prematurely disassociating a client device session from allocated resources of an internet service provider such that those resources may be provided to another client device.

Figure 7:
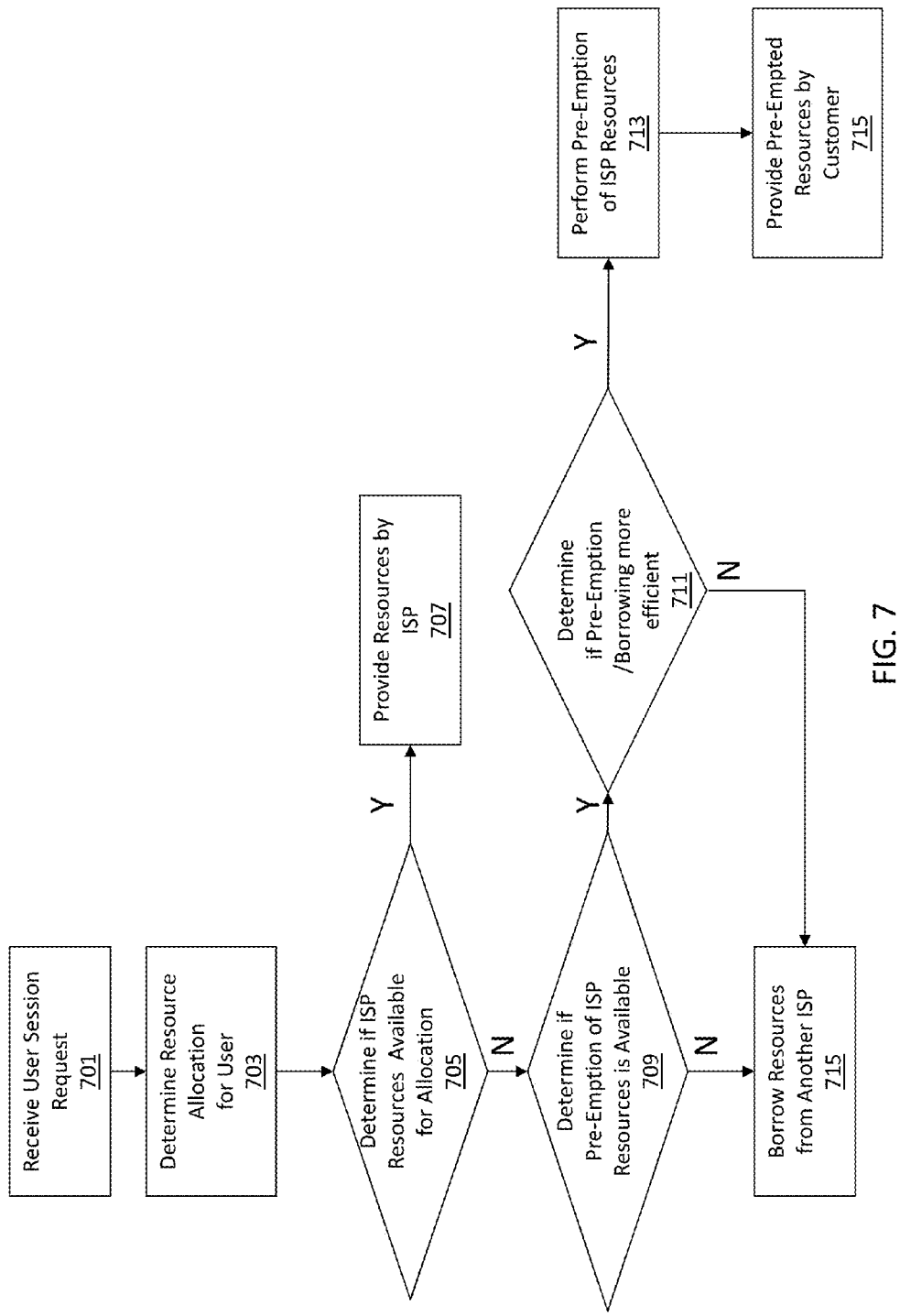
FIG. 7 is a flow chart illustrating a method for performing pre-emption by a broker module in accordance with some embodiments.

FIG. 7 is a flow chart illustrating a method for performing pre-emption by a broker module in accordance with some embodiments.

The broker module may first receive a user session request from a client device as shown at 701. For example, a client of a user device may request to interact with a certain game through its internet service provider.

The request may be forwarded to the broker module, which then determines how resources should be allocated for that client device as shown at 703. In determining how resources should be allocated for that client device, a determination is first made by the broker module as to whether the internet service provider associated with the client device can currently provide the resources needed by the client device as shown at 705. For example, the broker module may communicate with the resource manager or data center managers of the internet service provider associated with the client device to determine whether optimal resources are available at a blade for servicing the client device.

If the broker module determines that the internet service provider associated with the client device is capable of providing the resources needed by the client device in line with the constraints provided by the internet service provider, then the client device is provided resources from its associated internet service provider as shown at 707.

If the broker module determines that the internet service provider associated with the client device is incapable of currently providing the resources needed by the client device in line with constraints provided by the internet service provider, then the broker module determines whether pre-emption of the internet service provider's resources is available as shown at 709. For example, the broker module may determine that a client device belonging to a non-paying guest is currently occupying resources of the internet service provider that are optimal for the requesting client device. If the requesting client device belongs to a paying user, then the broker module may determine that the resources occupied by the guest client device may be pre-empted.

If the broker module determines that pre-emption of the internet service provider's resources is not available, then the broker module borrows resources from another internet service provider as shown at 717.

If the broker module determines that pre-emption of the internet service provider's resources is available, the broker module then determines whether it is more efficient to perform pre-emption or whether it is more efficient to borrow resources from another internet service provider as shown at 711.

If the broker module determines that it is more efficient to borrow resources from another internet service provider, then the broker module borrows resources from another internet service provider to service the requesting client device as shown at 717.

If the broker module determines that it is more efficient to perform pre-emption, then the broker module may perform pre-emption of the internet service provider's resources as shown at 713. This may involve disassociating the client device currently occupying the internet service provider's resources. The pre-empted resources of the internet service provider may then be provided to the requesting client device as shown at 715. In this way, the broker module is able to provide resources of an internet service provider to a client device associated with users of high priority.

Figure 8A:
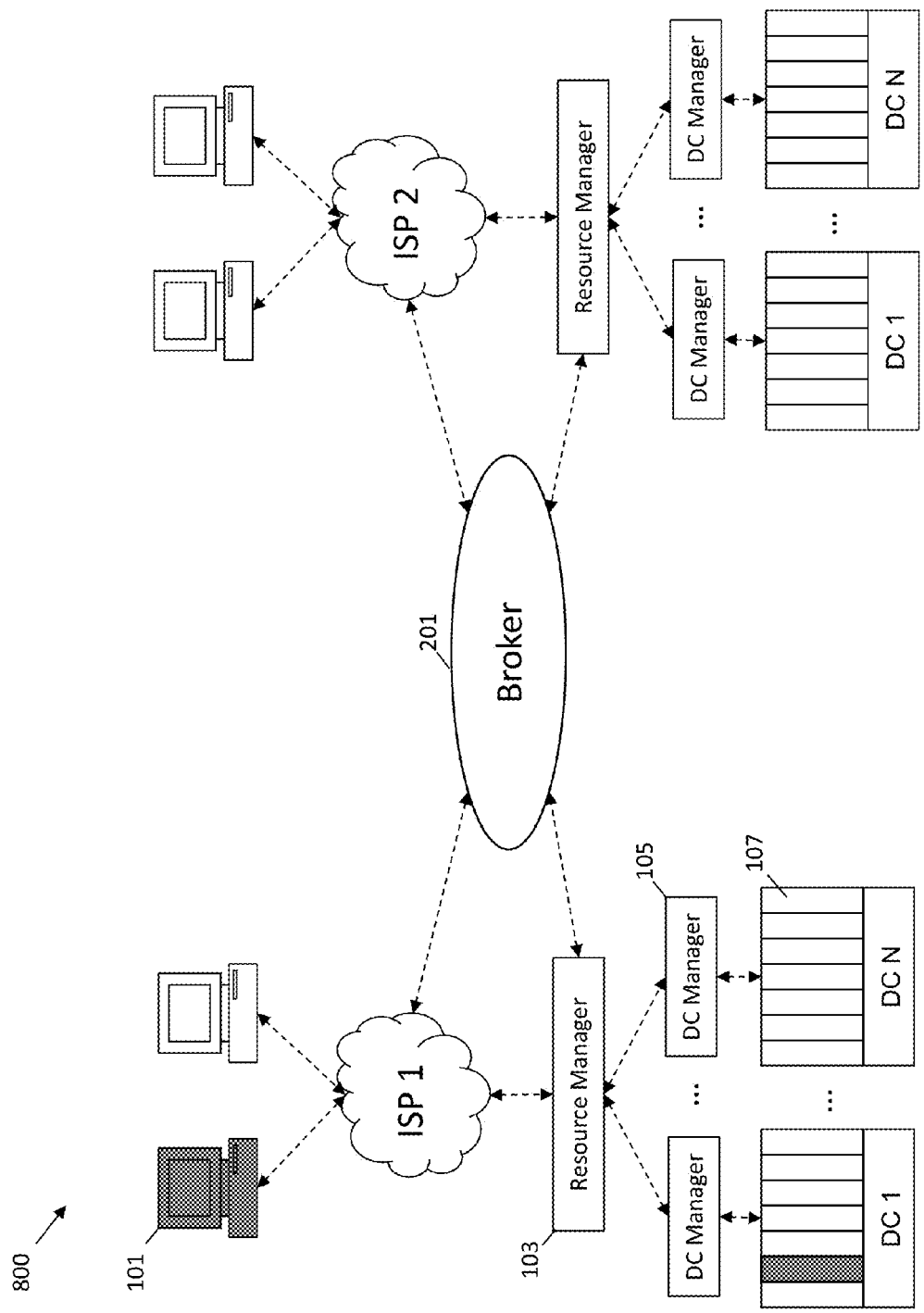
FIGS. 8A and 8B illustrate a remote gaming environment where a broker module performs pre-emption of an internet service provider's resources in accordance with some embodiments.
Figure 8B:
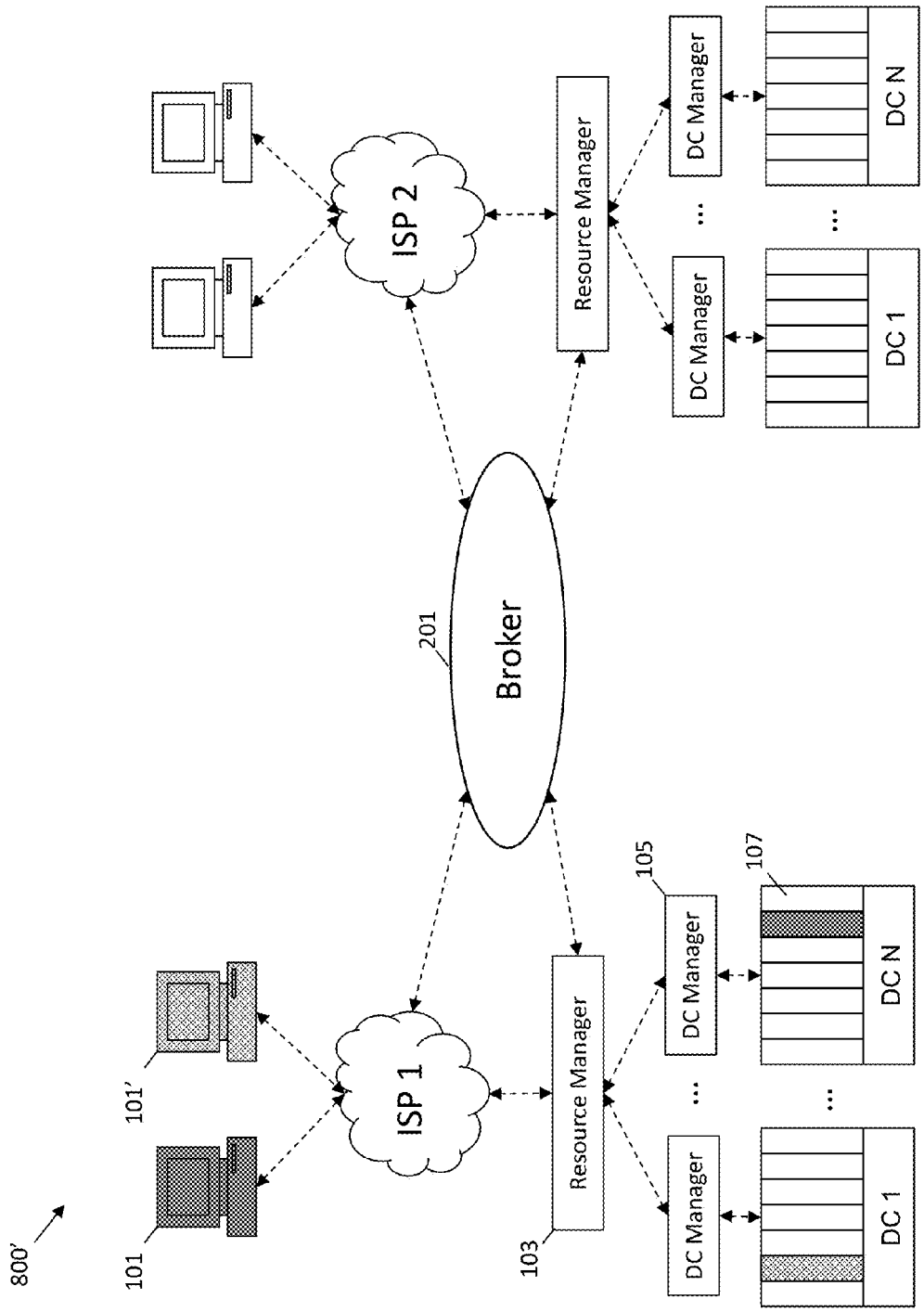

FIGS. 8A and 8B illustrate a remote gaming environment 800, 800' where a broker module 201 performs pre-emption of an internet service provider's resources in accordance with some embodiments. The determination by the broker module 201 as to whether or not to perform pre-emption of an internet service provider's resources may be made in accordance with the method depicted in FIG. 7. The remote gaming environments 800, 800' of FIGS. 8A and 8B are substantially similar to the remote gaming environment 200 of FIG. 2 and as such will not be described again in detail.

In the remote gaming environment 800 of FIG. 8A, a first client device belonging to a non-paying guest (depicted by gray shading) 101 is allocated resources of a first internet service provider ISP1 by the broker module 201.

In the remote gaming environment 800' of FIG. 8B, resources previously occupied by the first client belonging to the non-paying guest (depicted by grey shading) 101 are pre-empted and provided to a second client device belonging to a paying user (depicted by patterned shading) 101'. The first client belonging to the non-paying guest (depicted by grey shading) 101 may then be provided sub-optimal resources at another blade 107 of another data center DC associated with the first internet service provider ISP1 as illustrated in FIG. 8B. Alternatively, after pre-emption, the first client belonging to the non-paying guest (depicted by grey shading) 101 may be provided resources of another internet service provider or not provided resources at all.

While the above description has been provided with reference to the context of gaming, it is important to note that the broker module may provide management and monitoring to several internet service providers in any remote application context.

System Architecture Overview

Figure 9:
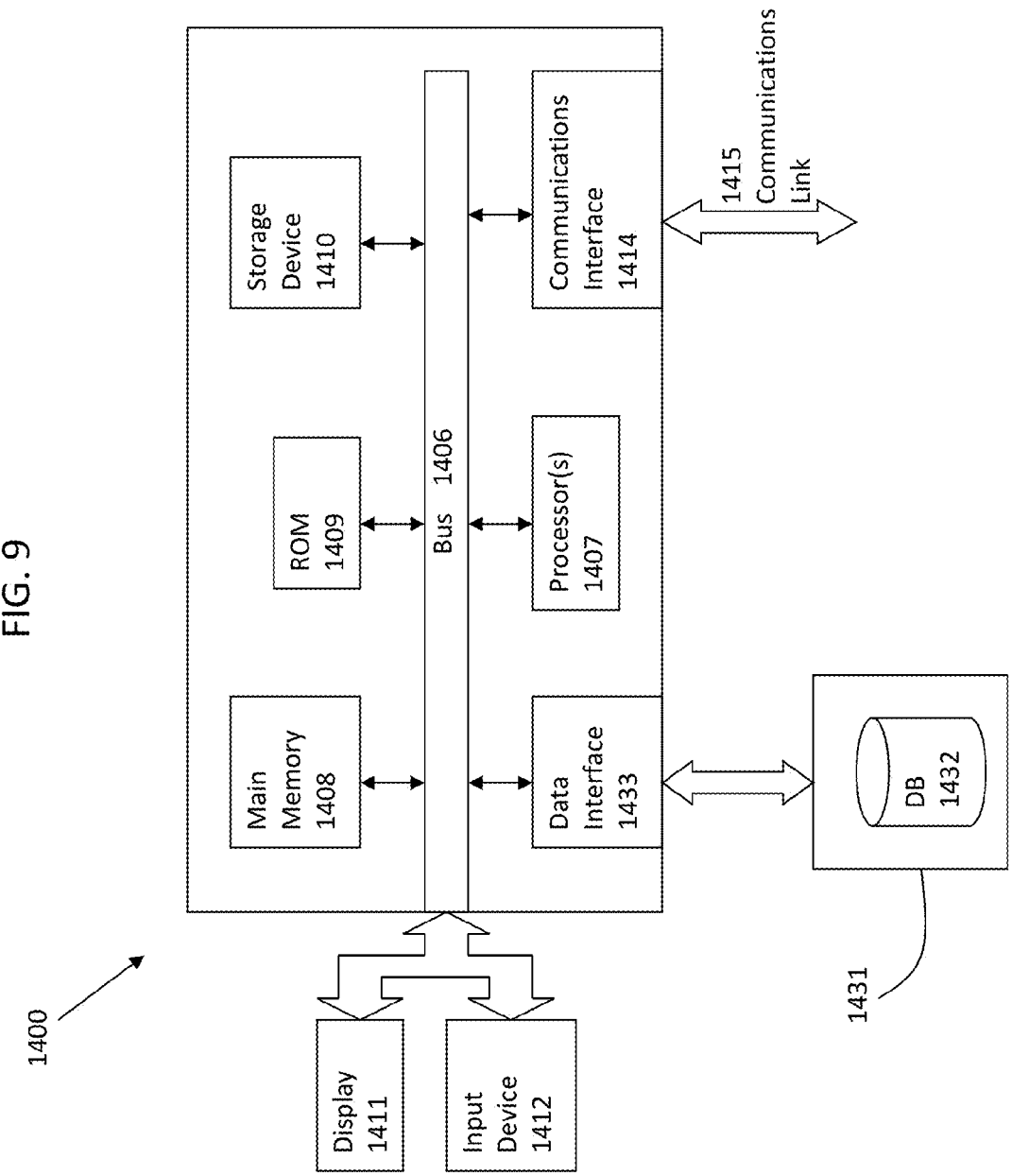
FIG. 9 is a block diagram of an illustrative computing system suitable for implementing an embodiment of the present invention.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for managing resources between a plurality of internet service providers, comprising:
   receiving, by a broker module in communication with each of the plurality of internet service providers, from each of the plurality of internet service providers, a set of resources and constraints for each internet service provider of the plurality of internet service providers, each set of resources and constraints including a location policy defining a proximity to an allocated resource and a response time from an allocated resource, and a service level agreement defining priorities for resource allocation;
   allocating, by the broker module, resources of the plurality of internet service providers to service client devices of the plurality of internet service providers in accordance with the set of resources and constraints for each of the plurality of internet service providers, wherein, at least some resources of a first internet service provider are allocated for servicing a second client device that is associated with a second internet service provider;
   receiving, by the broker module, a request for resources from a first client device associated with the first internet service provider;
   pre-empting, by the broker module, the resources of the first internet service provider allocated for servicing the second client device in response to the request for resources from the first client device when it is determined that the first client device has a higher priority for the resources provided by the first internet service provider than the second client device, the priority being based on the service level agreement defining priorities for resource allocation;
   re-allocating, by the broker module, the resources of the first internet service provider previously allocated to the second client device to the first client device; and
   allocating, by the broker module, resources from one of the plurality of internet service providers for servicing of the second client device.

2. The method of claim 1, wherein allocating resources of the plurality of internet service providers to client devices of the plurality of internet service providers comprises employing a learning process that utilizes statistics and metrics to optimize resource allocation.

3. The method of claim 2, wherein the statistics and metrics comprise a number of resources an internet service provider of the plurality of internet service providers have available.

4. The method of claim 2, wherein the statistics and metrics comprise a number of resources out of a number of available resources used by an internet service provider of the plurality of internet service providers.

5. The method of claim 2, wherein the statistics and metrics comprise at least one of a number of resources loaned, or a number or resources borrowed, by an internet service provider of the plurality of internet service providers.

6. The method of claim 1, wherein the set of resources for an internet service provider comprises a number of available data centers and a number of available blades associated with the available data centers.

7. The method of claim 1, wherein the set of constraints for an internet service provider comprises location policies for the internet service provider, service level agreements for the internet service provider, or custom content for the internet service provider.

8. The method of claim 7, wherein the location policies comprise IP proximity constraints, ping time constraints, data center capacity constraints, or link quality constraints.

9. The method of claim 7, wherein the service level agreements comprise priority for the internet service provider, bursting capabilities for the internet service provider, and lending/sharing constraints for the internet service provider.

10. The method of claim 1, wherein at least some resources of the first internet service provider are allocated for servicing the client device that is associated with the second internet service provider because the set of resources for the second internet service provider is utilized at maximum capacity.

11. The method of claim 1, wherein at least some resources of the first internet service provider are allocated for servicing the client device that is associated with the second internet service provider because an optimal set of resources of the second internet service provider for servicing the client device is occupied by another client device.

12. The method of claim 1, wherein at least some resources of the first internet service provider are allocated for servicing the client device that is associated with the second internet service provider because the set of resources for the first internet service provider is under-utilized.

13. A computer program product comprising a non-transitory computer usable medium having executable code to execute a method for managing resources between a plurality of internet service providers, the method comprising:
receiving, by a broker module in communication with each of the plurality of internet service providers, from each of the plurality of internet service providers, a set of resources and constraints for each internet service provider of the plurality of internet service providers, each set of resources and constraints including a location policy defining a proximity to an allocated resource and a response time from an allocated resource, and a service level agreement defining priorities for resource allocation;
allocating, by the broker module, resources of the plurality of internet service providers to service client devices of the plurality of internet service providers in accordance with the set of resources and constraints for each of the plurality of internet service providers, wherein, at least some resources of a first internet service provider are allocated for servicing a second client device that is associated with a second internet service provider;
receiving, by the broker module, a request for resources from a first client device associated with the first internet service provider;
pre-empting, by the broker module, the resources of the first internet service provider allocated for servicing the second client device in response to the request for resources from the first client device when it is determined that the first client device has a higher priority for the resources provided by the first internet service provider than the second client device, the priority being based on the service level agreement defining priorities for resource allocation;
re-allocating, by the broker module, the resources of the first internet service provider previously allocated to the second client device to the first client device; and
allocating, by the broker module, resources from one of the plurality of internet service providers for servicing of the second client device.

14. The computer program product of claim 13, wherein allocating resources of the plurality of internet service providers to client devices of the plurality of internet service providers comprises employing a learning process that utilizes statistics and metrics to optimize resource allocation.

15. The computer program product of claim 14, wherein the statistics and metrics comprise a number of resources an internet service provider of the plurality of internet service providers have available.

16. The computer program product of claim 14, wherein the statistics and metrics comprise a number of resources out of a number of available resources used by an internet service provider of the plurality of internet service providers.

17. The computer program product of claim 14, wherein the statistics and metrics comprise a number of resources loaned, or a number of resources borrowed, by an internet service provider of the plurality of internet service providers.

18. The computer program product of claim 13, wherein the set of constraints for an internet service provider comprises location policies for the internet service provider, service level agreements for the internet service provider, or custom content for the internet service provider.

19. The computer program product of claim 13, wherein at least some resources of the first internet service provider are allocated for servicing the client device that is associated with the second internet service provider because the set of resources for the second internet service provider is utilized at maximum capacity.

20. The computer program product of claim 13, wherein at least some resources of the first internet service provider are allocated for servicing the client device that is associated with the second internet service provider because an optimal set of resources of the second internet service provider for servicing the client device is occupied by another client device.

21. The computer program product of claim 13, wherein at least some resources of the first internet service provider are allocated for servicing the client device that is associated with the second internet service provider because the set of resources for the first internet service provider is under-utilized.

22. A system for managing resources between a plurality of internet service providers, comprising:
a plurality of client devices;
the plurality of internet service providers associated with the plurality of client devices; and a broker module in communication with the plurality of internet service providers, the broker module managing resources between the plurality of internet service providers, the broker module:
  receiving a set of resources and constraints for each internet service provider of the plurality of internet service providers, each set of resources and constraints including a location policy defining a proximity to an allocated resource and a response time from an allocated resource, and a service level agreement defining priorities for resource allocation;
  allocating resources of the plurality of internet service providers to service client devices of the plurality of internet service providers in accordance with the set of resources and constraints for each of the plurality of internet service providers, wherein at least some resources of a first internet service provider are allocated for servicing a second client device that is associated with a second internet service provider;
  receiving, by the broker module, a request for resources from a first client device associated with the first internet service provider;
  pre-empting, by the broker module, the resources of the first internet service provider allocated for servicing the second client device in response to the request for resources from the first client device when it is determined that the first client device has a higher priority for the resources provided by the first internet service provider than the second client device, the priority being based on the service level agreement defining priorities for resource allocation;
  re-allocating, by the broker module, the resources of the first internet service provider previously allocated to the second client device to the first client device; and
  allocating, by the broker module, resources from one of the plurality of internet service providers for servicing of the second client device.

23. The method of claim 1, wherein receiving statistics and metrics related to the resources of the plurality of internet service providers includes at least one of:
  receiving the statistics and metrics related to the resources of the plurality of internet service providers in response to a request from a broker module allocating the resources, or
  receiving the statistics and metrics related to the resources of the plurality of internet service providers at the broker module automatically based on a preset schedule.

* * * * *